United States Patent [19]

Husted

[11] Patent Number: 4,493,678
[45] Date of Patent: Jan. 15, 1985

[54] EXPANDIBLE SPROCKET

[75] Inventor: Royce H. Husted, Wheaton, Ill.

[73] Assignee: Samuel Shiber, Mundelein, Ill.

[21] Appl. No.: 387,618

[22] Filed: Jun. 11, 1982

Related U.S. Application Data

[63] Continuation-in-part of Ser. No. 310,506, Oct. 13, 1981, abandoned.

[51] Int. Cl.³ .................. F16H 55/30; F16H 55/54
[52] U.S. Cl. ................................ 474/164; 474/49; 474/57
[58] Field of Search .............. 474/49, 56, 57, 164; 308/3.6

[56] References Cited

U.S. PATENT DOCUMENTS

| 524,830 | 8/1894 | Leggo | 474/56 |
|---|---|---|---|
| 593,895 | 11/1897 | Jasper | 474/54 |
| 742,497 | 10/1903 | Rowand | 474/56 |
| 2,421,368 | 6/1947 | Aubert | 474/56 |
| 3,661,024 | 9/1972 | Cooke | 474/56 |
| 3,850,044 | 11/1974 | Hagen | 474/56 |
| 3,850,045 | 11/1974 | Hagen | 474/56 |
| 3,867,851 | 2/1975 | Gregory | 474/56 |
| 3,938,403 | 2/1976 | Donaldson | 474/56 |
| 3,956,943 | 5/1976 | Yamasaki | 474/164 |
| 3,995,508 | 12/1976 | Newell | 474/56 |
| 4,129,044 | 12/1978 | Erickson | 474/55 |
| 4,260,386 | 4/1981 | Frohardt | 474/72 |
| 4,268,259 | 5/1981 | Segawa et al. | 474/164 |
| 4,304,449 | 12/1981 | Litchfield et al. | 308/3.6 |
| 4,325,702 | 4/1982 | Jacobson | 474/56 |
| 4,330,286 | 5/1982 | Nagano | 474/164 |
| 4,342,559 | 8/1982 | Williams | 474/49 |

FOREIGN PATENT DOCUMENTS

| 8851 | 3/1980 | European Pat. Off. . |
| 3107255 | 9/1982 | Fed. Rep. of Germany . |
| 961243 | 5/1950 | France . |
| 453712 | 9/1936 | United Kingdom . |
| 2062142 | 5/1981 | United Kingdom . |

OTHER PUBLICATIONS

"Automatic Bike Transmission", *Popular Science*, Nov. 1980, David Scott, pp. 82–83.
Hagen All-Speed Advertisement.
Fact Sheet: New Tokheim Gear-Maker 5 Speed Bicycle Transmission, Fact Sheet.

*Primary Examiner*—Rodney H. Bonck
*Assistant Examiner*—Michael David Bednarek
*Attorney, Agent, or Firm*—Samuel Shiber

[57] ABSTRACT

A variable sprocket, particularly suitable for a bicycle transmission, comprising a drive flange and an indexing flange mounted on an axle with a pair of sprocket-segment-planets and at least two idler-planets sandwiched between said flanges forming a relatively rigid variable-sprocket, the planets adapted to expand and contract in response to a relative rotation of the flanges and thereby change the effective diameter of the variable-sprocket.

8 Claims, 11 Drawing Figures

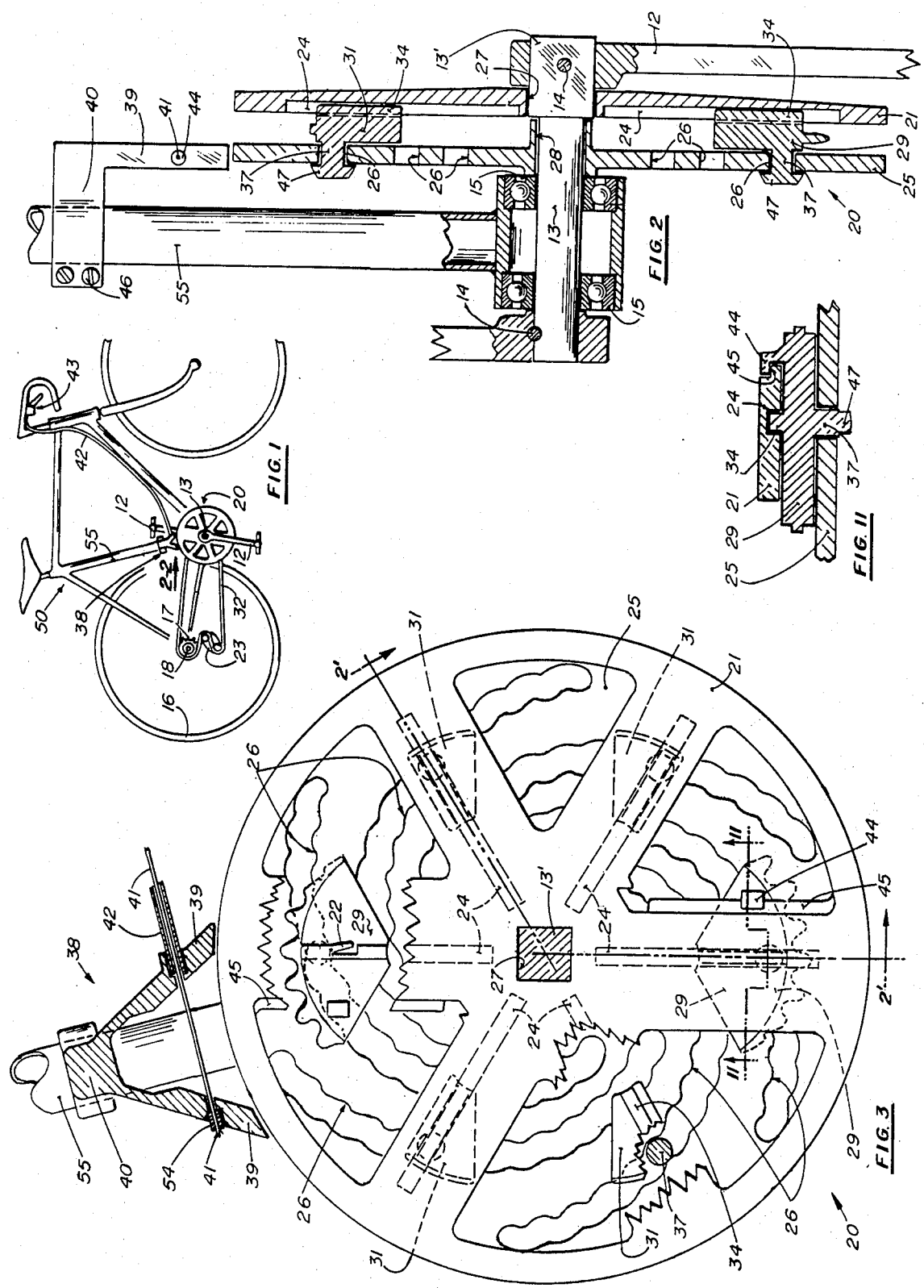

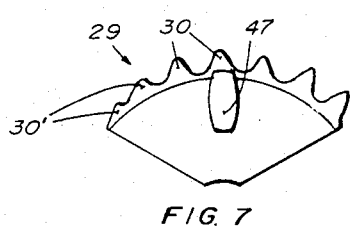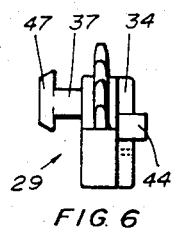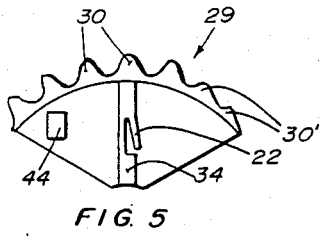
FIG. 7   FIG. 6   FIG. 5
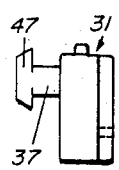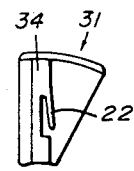
FIG. 10   FIG. 9   FIG. 8
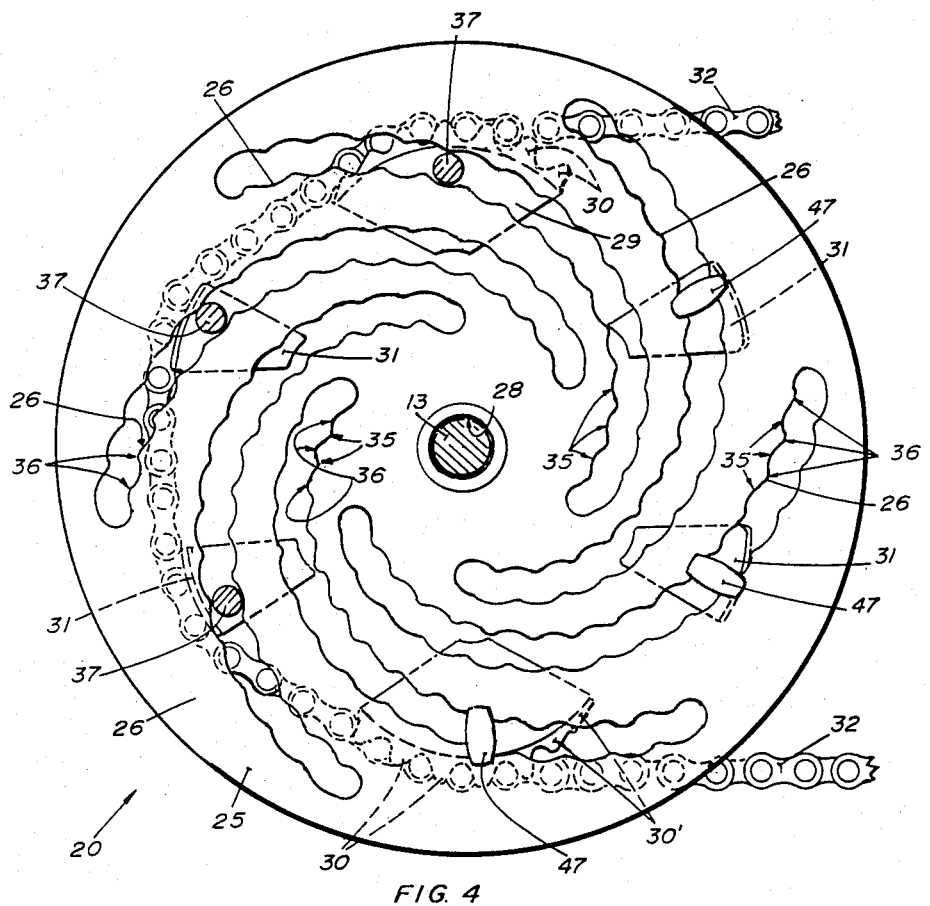
FIG. 4

EXPANDIBLE SPROCKET

BACKGROUND & SUMMARY OF THE INVENTION

This application is a continuation in part of my copending application titled Bicycle Transmission, Ser. No. 310,506 filed on Oct. 13, 1981 now abandoned.

Presently, ten speed bicycle transmissions consist of a chain wrapped around a front double sprocket and a rear cluster containing five sprockets, a front derailleur and a rear derailleur for derailing the chain from one sprocket to another in response to rider moving two control levers which are connected to the derailleurs. The derailleurs are made of a large number of delicate parts which need frequent maintenance and are easily damaged. The derailleur system is also hard to operate, it generates a continuous noise and inefficiencies in certain gears due to chain's misalignment and it calls for a frequent visual inspection by the rider, diverting his attention from the road. For these reasons several attempts have been made in the past to introduce different systems some of which are based on variable sprockets. Examples of such efforts can be found in U.S. Pat. Nos. 3,850,044 and 3,850,045. Some of the reasons for such systems being commercially unsuccessful, on a large scale, were their complexity, high cost, added weight and maintenance problems. Another example is found in British Pat. No. 453,712 where the two flanges are stacked together with the planets being side saddled in a cantilevered position. Such an arrangement induces severe stresses under working loads which leads to severe deformation of the variable sprocket under working loads, especially since the flanges have to be perforated and loose most of their structural integrity. These deformations interfere with the synchronization of the sprocket-segment-planets and the chain. In contrast, the object of the present invention is to overcome these and other problems, and provide a simple durable system which can be economically mass produced from metal or molded plastic.

BRIEF DESCRIPTION OF THE DRAWINGS

FIG. 1 shows a side view of a bicycle equipped with a variable sprocket according to the present invention, FIG. 2 shows a portion of the bicycle and the variable sprocket as viewed in the direction pointed by an arrow 2—2 marked on FIG. 1, with the sprocket itself sectioned along line 2'—2' marked on FIG. 3 to show the idler-planet as well as the sprocket-segment-planet, FIG. 3 shows a partially broken front view of the variable sprocket, FIG. 4 shows a rear view of a variable sprocket with three of the six locking means removed, FIGS. 5, 6 and 7 show front, side and rear views, respectively, of a sprocket-segment-planet, FIGS. 8, 9 and 10 show front, side and rear views, respectively, of the idler-planet, and FIG. 11 shows a cross section of an area of the variable sprocket which contains the sprocket-segment-planet, as viewed along section line 11—11 marked on FIG. 3.

DETAILED DESCRIPTION OF THE DRAWINGS

The attached FIGURES show a bicycle (please note FIG. 1) having a frame 50 with a seat post member 55, pedals 12 which are affixed to an axle 13 by bolts 14. The axle 13 is rotatably mounted in the frame by means of ball-bearings 15. A wheel 16 is also rotatably mounted to the frame 50 in a conventional manner. The bicycle is equipped with a variable ratio transmission comprising a variable-sprocket 20 that is coupled by a conventional roller chain 32 to a sprocket 17 that is, in turn, coupled to the wheel 16 via a one-way-clutch 18 in a conventional manner. The variable-sprocket 20 comprises (please note FIGS. 2, 3 & 4):

The axle 13, a drive flange 21 having a square bore 27 which is fitted on a square section 13' of the axle 13, an indexing flange 25 having a round bore 28 which is rotatably fitted on a round section of the axle 13 opposite of the drive flange 21 and having a plurality of spiral-wavy-cams 26, two sprocket-segment-planets 29 and at least two idler-planets 31 sandwiched between the flanges 21 and 25 forming a relatively rigid structure (as compared to an arrangement were the planets are not sandwiched but instead are catilevered on only one of their sides, thereby creating stresses and deformation in the flanges).

Coupling means, in the form of elongated keys 34 and respective radial keyways 24, for tangentially connecting said planets to said drive flange 21, cam-followers 37 attached to the planets 29 and 31 for engaging with and following their respective spiral-wavy-cam 26, the spiral-wavy-cam comprising a series of alternating depressions 35 and hills 36 which move the planet whose cam-follower 37 is engaged with the spiral-wavy-cam 26, closer and further from the axle 13, respectively, as said planet slides along said spiral-wavy-cam 26. Locking means 47 formed at the end of the cam-followers 37 slide along an outer surface of the indexing flange 25. Under working loads which may cause a slight deformation of the indexing flange 25, the locking means 47 engages the outer surface of the indexing flange 25 and prevents the separation of the planets 29 and 31 from it (the elongated shape of the locking means 47 allows their assembly with the indexing flange 25). The sprocket-segment-planets 29 are equipped with additional locking means 44 which slide along an outer surface 45 of the drive flange 21 for preventing separation between them. The reason for equipping only the sprocket-segment-planets 29 with these additional locking means 44, is that the sprocket-segment-planets 29 carry the tangential force which tends to twist them around the key 34, a problem which does not appear in the idler-planets 31.

A small cantilever spring 22 is formed as a part of the key 34, and is adapted to create a preload between the key 34 and the keyway 24 for preventing the planets from developing an annoying rattle while they are not engaged with the chain 32.

The chain 32 (please note FIG. 4) is wrapped around approximately one half of the variable-sprocket 20, and engages the teeth 30 that are formed on an rounded section of the sprocket-segment-planets 29 (the leading teeth 30' are partially removed to prevent these teeth from interfering with the chain 32 when the transmission is shifted to high ratios). The chain 32 is made of links and has a pitch length equalling the length of the chain 32 divided by the number of links contained in the chain. It should be understood that while a conventional bicycle roller chain is considered a preferred chain from an economical point of view, the term chain, as used herein, covers other chains and toothed belts which could be used for putting together the system. As the bicycle is pedaled, tension is developed in the chain 32 which in turn creates tangential and radial loads on the planets. The tangential loads are taken by the sprocket-segment-planets 29 and are transmitted to the keys 34 which are formed on the side of each of the sprocket-segment-planets 29, and which engage with and slide in the radial keyway 24, transmitting these loads to the drive sprocket 21. Radial loads which appear in the planets 29 and 31 around which the chain 32 is wrapped, are transmitted to the spiral-wavy-cams 26, through cam-followers 37 formed on the sides of the planets 29 and 31. The radial load forces and secures the planets 29 and 31 in the depressions 35. The spiral-wavy-cams 26 are so located and spaced that when the planets 29 and 31 are seated in the depressions 35 and when both the sprocket-segment-planets 29 are engaged with the chain 32 (please note FIG. 4) which is wrapped around the variable-sprocket 20, the length of the chain trapped between the sprocket-segment-planets 29 is without excessive slack. Improper relative spacing of the spiral-wavy-cams 26 would cause this trapped length of chain to be either saggy or it would prevent it from properly meshing with one of the sprocket-segment-planets 29, and in either case it would prevent the proper operation of the variable-sprocket 20.

A one piece molded brake 38 (please note FIG. 3) comprises arms 39 which are flexibly pivoted on a stem 40 which is affixed to the frame member 55 by screws 46. The arms 39 are adapted to frictionally engage and brake the indexing flange 25 in response to being squeezed between a cable 41 attached to one of the arms 39 by means of a crimped ferrule 54 and an outer jacket 42. At their outer end the cable 41 and its jacket 42 are connected to a conventional hand lever assembly 43 which the rider can depress in order to pull the cable 41 inside the jacket 42, and thereby engage the brake 38. When the indexing flange 25 is braked and the drive flange 21 is rotated through the pedals 12, forward and backwards, intersections of the keyways 24 and the spiral-wavy-cams 26 expand and contract together with the planets 29 and 31, respectively, causing the transmission to change to a high and a low ratio, respectively (a lower ratio being a ratio at which the wheel 16 rotates less revolutions per one revolution of the variable-sprocket 20).

The spiral-wavy-cams 26 are arranged so that the sprocket-segment-planets 29 remain at a substantially symmetrical position relative to the axle 13, so that an imaginary line drawn through the sprocket-segment-planets 29 will pass through the axle 13. Thereby, at least one sprocket-segment-planet 29 is engaged with the chain 32 at all times to maintain the power transmission between the sprockets 17 and 20, and most of the time only one sprocket-segment-planet 29 will be engaged allowing the transmission to change to a higher ratio (if the sprocket-segment-planets 29 were clustered together, at a certain point during the rotation of the variable-sprocket 20 none would be engaged with the chain 32 which wraps, approximately, only one half of the variable-sprocket 20). Thus, as the variable-sprocket 20 rotates the chain 32 is engaged, alternately, with one sprocket-segment-planet 29 or with the other, with a short transitional overlap during which both sprocket-segment-planets 29 are engaged. In order to make the transition between the sprocket-segment-planets 29 as smooth as possible, it is preferred to make it while a minimum amount of power is transmitted through the chain 32. Since the transition occures when the sprocket-segment-planets 29 are at their top/bottom position, and since a rider usually pedals lighter when the pedals are at their top/bottom position, arranging the pedals 12 and the sprocket-segment-planets 29 along the same imaginary line will synchronize the two to coincide.

Each of the planets 29 and 31 is engaged with its own respective keyway 24 and the respective spiral-wavy-cam 26 which control the location of the respective planet. Therefore, it is a designer's option to maintain all the planets 29 and 31 at equal distances from the axle 13 or to move one opposing pair, planets 29 for example, further away from the axle 13 so that an imaginary ellipse can be drawn through planets 29 and 31. When such a configuration of planets is orientated relative to the pedals in accordance with certain bio-engineering theories, the utilization of the rider's capabilities should be improved. Further, one of the planets 29 can be moved slightly further than the other in order to provide, again with proper orientation of the variable-sprocket 20 and the pedals 12, a slightly higher ratio when the rider's stronger foot, for example his right foot, pedals down. The planets 29 will still be maintained in substantially symmetrical positions relative to the axle 13. However, such minor custom modifications are probably worthwhile only for people who ride bikes competitively.

OPERATION

The bicycle is ridden and pedaled like a conventional bicycle, with the improvement that lowering the transmission ratio is done by back pedaling while energizing the brake 38 slowing the indexing flange 25 relative to the drive flange 21, causing the intersections of the keyways 24 and the spiral-wavy-cam 26 to move inwards and contract the planets 29 & 31 towards the axle 13. The one-way-clutch 18 permits the back pedaling even when the bicycle is stationary. When the planets 29 and 31 are contracted the amount of chain 32 that is wrapped around the sprocket 20 and that is pulled per revolution of the sprocket 20 is reduced. Shifting to a higher ratio is achieved by braking and slowing the indexing flange 25 relative to the drive flange 21 while pedaling forward, expanding the planets 29 and 31. Since tension in the chain energizes and secures the planets 29 & 31 in the depressions 35, it is easier to shift to a higher ratio when the only tension in the chain 32 is created by a conventional chain tensioner 43. The tensioner 43 assures a minimum of tension in the chain 32 in order to secure the planets 29 and 31 in the depressions 35 when the rider does not actively pedal, and take up chain's slack.

While the present invention has been illustrated with one embodiment, it should be understood that modifications and substitutions can be made without departing from the spirit of the invention or the scope of the claims.

I claim:
1. A variable sprocket comprising in combination:
an axle,
a drive flange mounted on said axle,
an indexing flange rotatably mounted on said axle opposite of said drive flange and having a plurality of spiral-wavy-cams,
two sprocket-segment-planets, said sprocket-segment-planet having leading teeth which provide initial contact with a chain and additional chain engaging teeth for subsequent engagement with said chain, at least a portion of said leading teeth is removed such that their profile is reduced relative to the profile of said chain engaging teeth, at least two idler-planets sandwiched between said flanges, coupling means for transmitting tangential forces between said spiral-wavy-cams and said drive flange, cam follower attached to said planets for engaging with and following said spiral-wavy-cams, said spiral-wavy-cams comprising a series of alternating depressions and hills which move the planets closer and further to and from said axle, respectively, as said planets slides along said spiral-wavy-cams, said chain made of links and having a pitch equalling the length of said chain divided by the number of said links, said chain wrapping approximately one half of the periphery of said variable-sprocket, tension in said chain generating tangential loads on said sprocket-segment-planets which are transmitted through said coupling means to said drive flange, tension in said chain also generating radial loads on said planets which are transmitted by said cam follower to said spiral-wavy-cams forcing and securing the cam follower in said depression, the location of said planets when their cam follower are seated in said depressions and when both sprocket-segment-planets are engaged with said chain is such that the length of chain which is trapped between said sprocket-segment-planets is a whole number of pitches.

2. The subject matter of claim 1, wherein said spiral-wavy-cams guide said cam-followers so that their position remains substantially symmetrical relative to said axle as they slide along said spiral-wavy-cams, so that at least one of said sprocket-segment-planets is engaged with said chain at all times and only one of said sprocket-segment-planets is engaged with said chain part of the time.

3. The subject matter of claim 1, wherein said planet has locking means to prevent it from separating from said spiral-wavy-cam under load.

4. The subject matter of claim 1, wherein said sprocket-segment-planet has locking means to prevent it from separating from said drive flange under load.

5. The subject matter of claim 1, wherein a pedal is affixed to said drive flange, said pedal being radially orientated approximately along a line passing through said sprocket-segment-planets.

6. The subject matter of claim 1, wherein said sprocket-segment-planets have chain engaging teeth, the leading teeth being at least partially removed to avoid improper engagement of these teeth with the chain when the planets are in an expanded position.

7. The subject matter of claim 1, wherein spring means for preloading said planets against at least one of said flanges is provided to prevent the planets from rattling.

8. The subject matter of claim 1, wherein said drive flange has radial keyways and said planets have keys adapted to slide in said keyways for aligning the planets and for transmitting tangential forces between said sprocket-segment-planets and said drive flange.

* * * * *